United States Patent
Yoshida et al.

(10) Patent No.: US 12,540,985 B2
(45) Date of Patent: Feb. 3, 2026

(54) DETECTOR AND NON-TRANSITORY COMPUTER READABLE MEDIUM FOR DETECTING SIGN OF THERMAL RUNAWAY OF SECONDARY BATTERY

(71) Applicant: DENSO CORPORATION, Kariya (JP)

(72) Inventors: Shuhei Yoshida, Kariya (JP); Masaki Uchiyama, Kariya (JP); Hiroki Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 18/464,303

(22) Filed: Sep. 11, 2023

(65) Prior Publication Data
US 2024/0094308 A1    Mar. 21, 2024

(30) Foreign Application Priority Data
Sep. 21, 2022 (JP) .................. 2022-150687

(51) Int. Cl.
*G01R 31/392* (2019.01)
*G01R 31/388* (2019.01)
(Continued)

(52) U.S. Cl.
CPC ......... *G01R 31/396* (2019.01); *G01R 31/388* (2019.01); *G01R 31/389* (2019.01); *G01R 31/392* (2019.01)

(58) Field of Classification Search
CPC .. G01R 31/396; G01R 31/389; G01R 31/392; G01R 31/388
(Continued)

(56) References Cited

U.S. PATENT DOCUMENTS

| | | | |
|---|---|---|---|
| 12,027,678 B2 * | 7/2024 | Krois ................... | H01M 50/249 |
| 2015/0158395 A1 * | 6/2015 | Li ...................... | H01M 10/486 |
| | | | 701/22 |

(Continued)

FOREIGN PATENT DOCUMENTS

JP    2020-180949 A    11/2020

OTHER PUBLICATIONS

Introducing the best wake-up timer IC for intermittent operation—ABLIC Corporation. https://ww.ablic.com/jp/semicon/products/rtc/wakeup-timer/intro., Apr. 8, 2019, pp. 1-6.

*Primary Examiner* — Huy Q Phan
*Assistant Examiner* — Trung Q Nguyen
(74) *Attorney, Agent, or Firm* — Harness, Dickey & Pierce, P.L.C.

(57) ABSTRACT

A detector includes a measurement unit and a battery control unit. The measurement unit measures a measurement value indicating a battery state of a secondary battery. The battery control unit detects a sign of thermal runaway in the secondary battery. The measurement unit determines whether a start-up signal is output based on the measurement value in a case where the battery control unit is in a sleep state, and outputs the start-up signal in a case where the start-up signal is output. The battery control unit starts by receiving the start-up signal from the measurement unit when the battery control unit is in the sleep state, executes arithmetic processing on the measurement value received from the measurement unit, and detects the sign of thermal runaway based on a calculated result of the arithmetic processing.

10 Claims, 11 Drawing Sheets

(51) Int. Cl.
*G01R 31/389* (2019.01)
*G01R 31/396* (2019.01)

(58) Field of Classification Search
USPC ..... 324/400, 426, 430–433, 500, 600, 76.11, 324/76.66, 96
See application file for complete search history.

(56) References Cited

U.S. PATENT DOCUMENTS

| | | | |
|---|---|---|---|
| 2018/0253137 A1 | 9/2018 | Cho et al. | |
| 2021/0190881 A1* | 6/2021 | Lee | H01M 10/633 |
| 2021/0194072 A1* | 6/2021 | Krois | H01M 50/249 |
| 2021/0288356 A1* | 9/2021 | Tsutsui | H01M 10/445 |
| 2022/0045544 A1 | 2/2022 | Kitagawa | |
| 2022/0166078 A1* | 5/2022 | Kim | H01M 10/486 |
| 2023/0231209 A1 | 7/2023 | Yamagami et al. | |
| 2024/0125863 A1* | 4/2024 | Kitagawa | G01R 35/00 |

\* cited by examiner

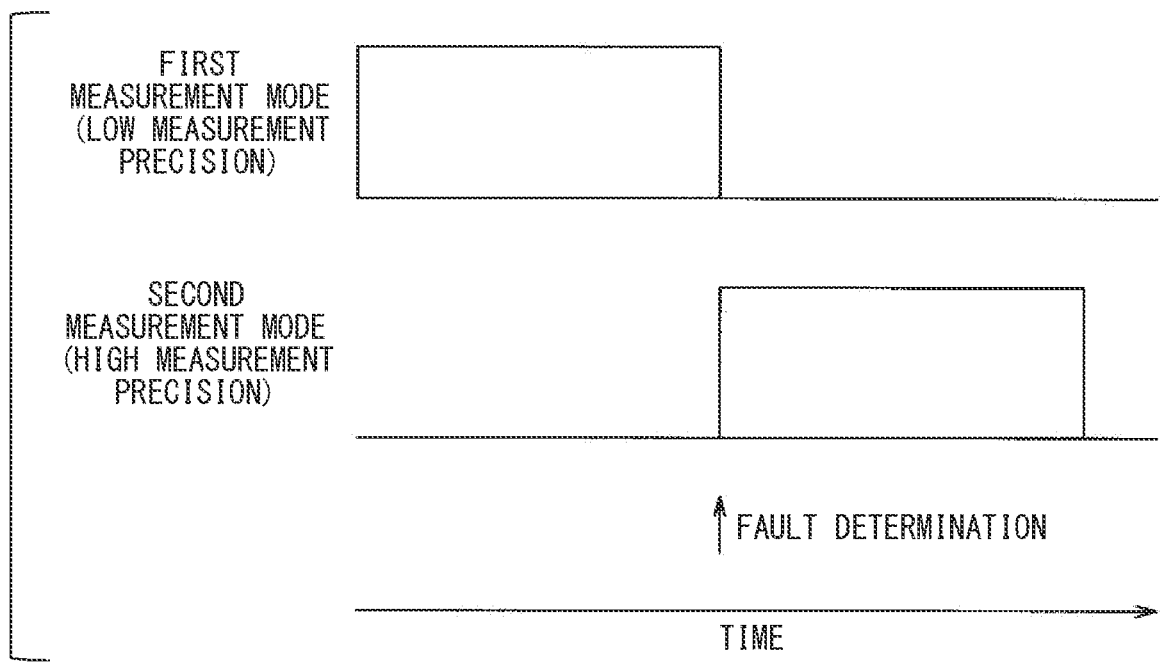

DETECTOR AND NON-TRANSITORY COMPUTER READABLE MEDIUM FOR DETECTING SIGN OF THERMAL RUNAWAY OF SECONDARY BATTERY

CROSS REFERENCE TO RELATED APPLICATION

This application is based on Japanese Patent Application No. 2022-150687 filed on Sep. 21, 2022, the disclosure of which is incorporated herein by reference.

TECHNICAL FIELD

The present disclosure relates to a detector and a non-transitory computer readable medium, each of which detects a sign of thermal runaway of a secondary battery.

BACKGROUND

A device in a related field may measure a complex independence of a secondary battery for multiple frequencies within a measurement range and create a complex impedance plane plot, for example, a Cole-Cole plot or a Bode plot based on a measured result to understand the characteristics of the secondary battery such as an electrode and electrolyte of the secondary battery.

SUMMARY

The present disclosure describes a detector and a non-transitory computer readable medium, each of which detects a sign of thermal runaway of a secondary battery, and further describes that the detector includes a measurement unit and a battery control unit.

BRIEF DESCRIPTION OF DRAWINGS

FIG. 3 is a time chart showing an example of a switchover from one measurement mode to another one measurement mode.

FIG. 4 illustrates multiple measurement modes.

DETAILED DESCRIPTION

Figure 1:
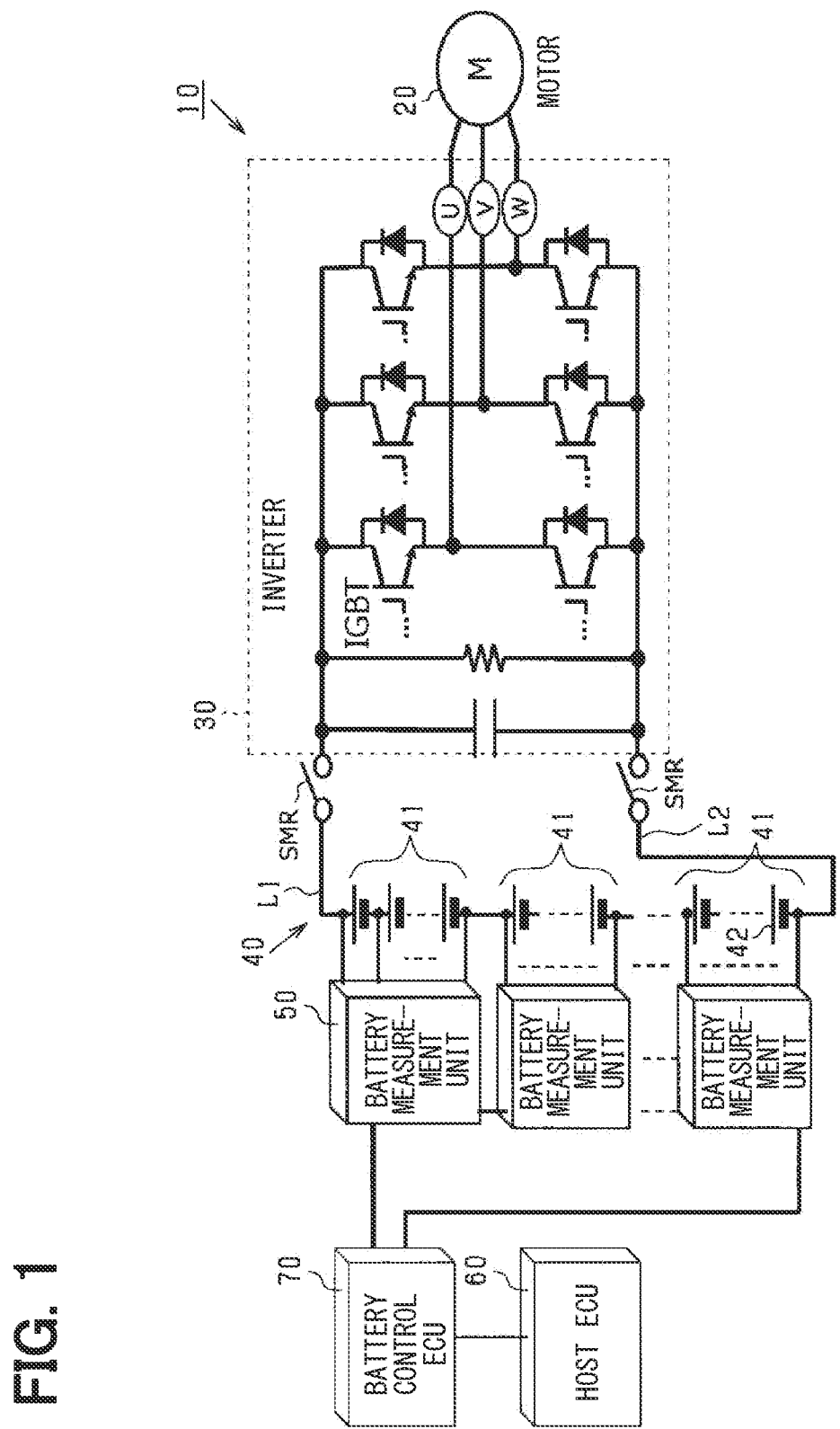
FIG. 1 illustrates an electric circuit of a power supply system.

In a rare situation, a secondary battery may have thermal runaway. As a countermeasure, it is conceivable to detect a sign of thermal runaway of the secondary battery from the acquired characteristics such as an electrode and electrolyte of the secondary battery. The thermal runaway of the secondary battery occurs doe not only occur during the operation of the secondary battery (during charging and discharging), but also may also occur during the stoppage of the operation of the second battery (during non-starting or during disconnection from an electric load). Therefore, even in a situation where the secondary battery or an arithmetic unit such as an ECU is not in operation (in other words, in a sleep state), it may be desirable to activate the secondary battery or the arithmetic unit to detect the sign of thermal runaway.

However, the timing of activating the arithmetic unit may be usually after the elapse of a certain period of time from the beginning of the stoppage of an operation of the arithmetic unit (in other words, the sleep state), and may be irrelevant to the state of the secondary battery. Therefore, the sign of thermal runaway may not be properly detected due to a timing during which the arithmetic unit is activated.

According to a first aspect of the present disclosure, a detector detects a sign of thermal runaway in a secondary battery. The detector includes a measurement unit and a battery control unit. The measurement unit measures a measured value indicating a battery state of the secondary battery. The battery control unit detects the sign of thermal runaway in the secondary battery. The measurement unit determines whether a start-up signal is output based on the measured value in a case where the battery control unit is in a sleep state, and outputs the start-up signal in a case where the start-up signal is output. The battery control unit starts by receiving the start-up signal from the measurement unit in a case where the battery control unit is in the sleep state, executes arithmetic processing on the measured value received from the measurement unit, and detects the sign of thermal runaway based on a calculated result of the arithmetic processing.

According to the above configuration, when the battery control unit is in the sleep state, the measurement device outputs the start-up signal based on the measured value, the battery control unit starts in response to receiving the start-up signal and executes the arithmetic processing on the measured value received from the measurement device to detect the sign of thermal runaway based on the calculated result. Therefore, it is possible to properly detect the sign of thermal runaway, in a situation where some kind of unusual change occurs in the battery state. Additionally, the battery control unit can be set in the sleep state to suppress the power consumption until some kind of unusual change occurs in the battery state.

According to a second aspect of the present disclosure, a non-transitory computer readable medium stores a computer program in a detector including a measurement unit for measuring a measured value indicating a battery state of a secondary battery and a battery control unit for detecting a sign of thermal runaway in the secondary battery. The computer program includes instructions, when executed by a processor, cause the processor to execute: determining, as a determined result, whether or not an start-up signal is output based on the measured value in a case where the battery control unit is in a sleep state; outputting the start-up signal in a case where the start-up signal is output; activating the battery control unit on a condition that the battery control unit receives the start-up signal from the measurement unit when the battery control unit is in the sleep state; executing arithmetic processing on the measured value received from the measurement unit; and detecting the sign of thermal runaway based on a calculated result of the arithmetic processing.

According to the above-mentioned non-transitory computer readable medium, when the battery control unit is in the sleep state, it is possible to output the start-up signal based on the measured value to start the battery control unit to detect the sign of thermal runaway. Therefore, it is possible to properly detect the sign of thermal runaway, in a situation where some kind of unusual change occurs in the battery state. Additionally, the battery control unit can be set in the sleep state to suppress the power consumption until some kind of unusual change occurs in the battery state.

The following embodiment describes that "a detector for detecting a sign of thermal runaway of a secondary battery" and "a non-transitory computer readable medium for detecting the sign of thermal runaway of the secondary battery" may be adapted to a power supply system of a vehicle such as a hybrid vehicle or an electric vehicle with reference to drawings.

As shown in FIG. 1, a power supply system 10 includes a motor 20 as a rotating electrical machine, an inverter 30 as a power converter for supplying a three-phase current to the motor 20, a rechargeable battery pack 40, a battery measurement unit 50 for measuring the state of the battery pack 40, a battery control ECU 70 for controlling the battery pack 40, and a host ECU 60 for controlling, for example, the motor 20. The battery measurement unit 50 is, for example, a battery monitoring board (CSC: Cell Supervision Circuit). The battery control ECU 70 is, for example, a battery management unit (BMU).

The motor 20 is a main machine adapted to the vehicle, and is capable of transmitting power to drive wheels (not shown). A motor generator is an example of the motor 20. In the embodiment, a three-phase permanent magnet synchronous motor is used as the motor 20. The inverter 30 includes a full bridge circuit having the same number of upper and lower arms as the number of phase windings, and a current supplied to each phase winding is adjusted by turning on and off the switches provided in each arm. A semiconductor switching element is an example of the switch. For example, an insulated gate bipolar transistor (IGBT) may be adopted as the switch.

The inverter 30 is provided with an inverter controller (not shown), and the inverter controller controls energization by turning on and off each switch in the inverter 30 based on various detection information in the motor 20 or a request for power running and power generation. As a result, the inverter controller supplies electric power from the battery pack 40 to the motor 20 via the inverter 30 to drive the motor 20 in power running mode. In addition, the inverter controller causes the motor 20 to generate power based on the power from the drive wheels, converts the generated power via the inverter 30 and then supplies it to the battery pack 40 to charge the battery pack 40.

The battery pack 40 is electrically connected to the motor 20 via the inverter 30. The battery pack 40 has a terminal voltage of, for example, 100 volts (V) or more. In the battery pack 40, multiple battery modules 41 are connected in series. In the battery module 41, multiple battery cells 42 are connected in series. As the battery cell 42 being the secondary battery, for example, a lithium iron phosphate (LFP) battery, a lithium-ion storage battery, or a nickel metal hydride storage battery can be used. Each battery cell 42 is a storage battery having an electrolytic solution being solution made of electrolyte and solvent and multiple electrodes.

As shown in FIG. 1, a positive terminal of an electrical load such as the inverter 30 is connected to a positive power supply path L1, which is connected to a positive power supply terminal of the battery pack 40. Similarly, a negative terminal of an electrical load such as the inverter 30 is connected to a negative power supply path L2, which is connected to a negative power supply terminal of the battery pack 40. A relay switch SMR, in other words, a system main relay switch is provided in each of the positive power supply path L1 and the negative power supply path L2. It is possible to perform energization or de-energization through the relay switch SMR.

The battery measurement unit 50 is a device that measures, for example, the state of charge (SOC) and state of health (SOH) of each battery cell 42. The battery measurement unit 50 may also be referred to as a measurement unit. The battery measurement unit 50 is connected to the battery control ECU 70. The battery measurement unit 50 measures the complex impedance of each battery cell 42, and outputs the result. The complex impedance may also be referred to as an impedance of each battery cell 42. The battery measurement unit 50 can measure the complex impedance, in other words, the alternating-current (AC) impedance of each battery cell 42 in multiple measurement modes with different measurement conditions. The following describes the configuration of the battery measurement unit 50.

The battery control ECU 70 controls the battery measurement unit 50 to measure the complex impedance of each battery cell 42 in the selected (switched) measurement mode. The battery control ECU 70 may also be referred to as a battery control unit or a battery controller. The battery control ECU 70 includes, for example, a mode switchover unit 71 and a thermal runaway (TR) detection unit 72. The mode switchover unit 71 may also be referred to as a switchover unit or a switchover device. The TR detection unit 72 may also be referred to as a detection unit. The following describes the mode switchover unit 71 and the TR detection unit 72. The battery measurement unit 50 and the battery control ECU 70 are included in the detector for detecting the sign of thermal runaway of the secondary battery.

The host ECU 60 requests the inverter controller for power running and power generation based on various information. The various information includes, for example, accelerator and brake operation information, vehicle speed and the state of the battery pack 40. The host ECU 60 also receives the measured result of the state of each battery cell 42 from the battery control ECU 70.

Figure 2:
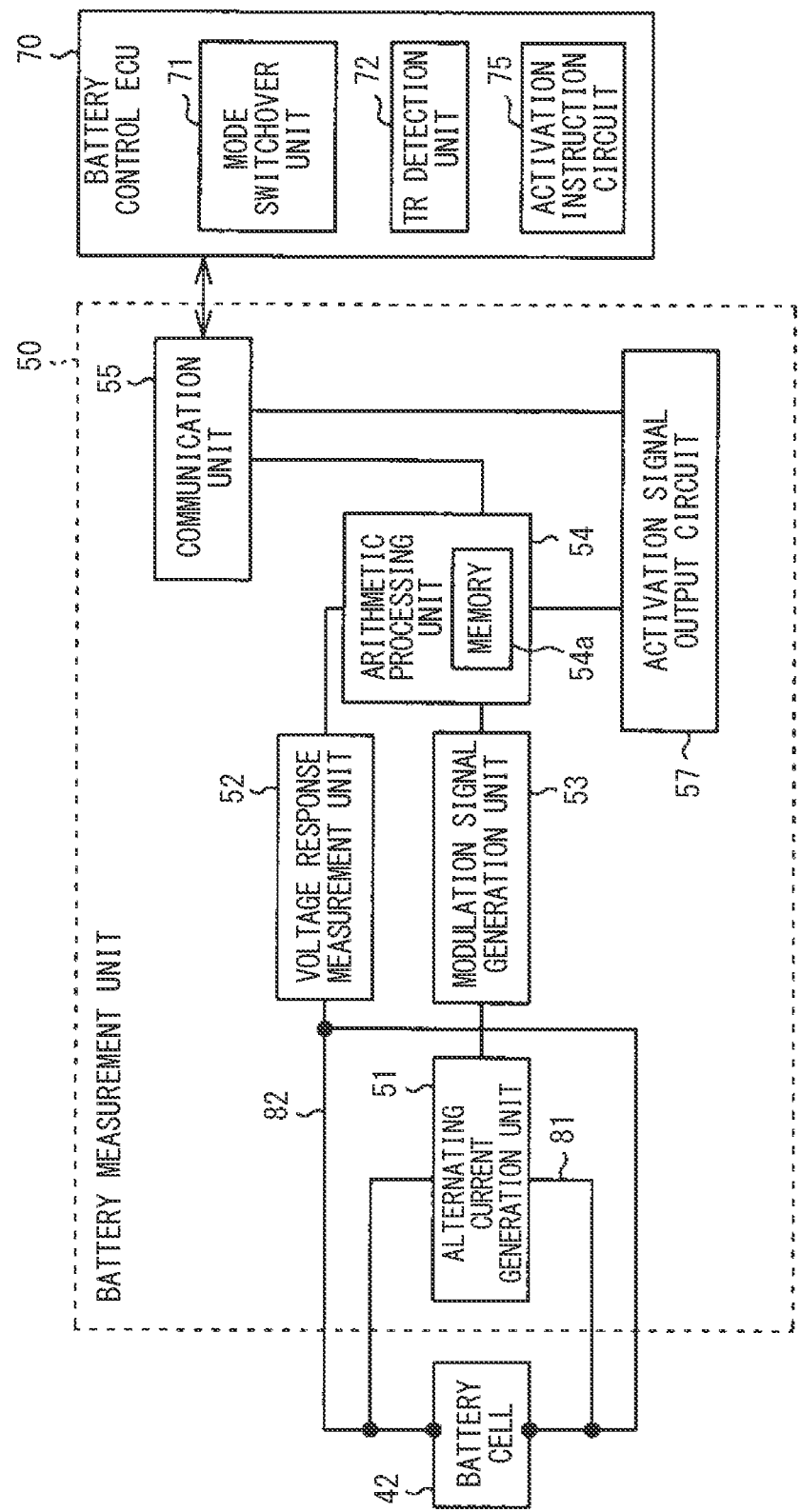
FIG. 2 is a block diagram of a battery measurement unit and a battery control ECU.

The following describes the battery measurement unit 50 and the battery control ECU 70. As shown in FIG. 2, the battery measurement unit 50 is provided so as to be able to measure the battery state of each battery cell 42. The battery measurement unit 50 includes an alternating current (AC) generation unit 51 connected to each battery cell 42 via a first electrical path 81 and a voltage response measurement unit 52 connected to each battery cell 42 via a second electrical path 82. In addition, the battery measurement unit 50 includes a modulation signal generator 53, an arithmetic processing unit 54, and a communication unit 55. The modulation signal generator 53 is connected to the AC generation unit 51. The arithmetic processing unit 54 is connected to the voltage response measurement unit 52 and the modulation signal generator 53. The communication unit 55 is connected to the arithmetic processing unit 54.

The AC generation unit 51 controls the battery cell 42 being a measurement target as a power supply to output an alternating current. The AC generation unit 51 may also be referred to as a current generator or a current generation unit. The alternating current may also be referred to as a fluctuating current, a changing current or a varying current. The AC generation unit 51 controls the battery cell 42 to output the alternating current based on an instruction signal received from the modulation signal generator 53. When the alternating current flows from the battery cell 42, a response signal reflecting complex impedance information is generated in the voltage across the terminals of the battery cell 42. The response signal corresponds to a voltage change or a voltage fluctuation. The voltage response measurement unit 52 measures the response signal reflecting information of the complex impedance of the battery cell 42 between the terminals of the battery cell 42. The voltage response measurement unit 52 may also be referred to as a voltage measurement unit.

The modulation signal generator 53 has an oscillator that generates an AC signal with an arbitrary waveform. Then, the modulation signal generator 53 causes the oscillator to generate the AC signal according to a command of the arithmetic processing unit 54.

Although the AC signal according to the present embodiment is a sine wave signal, the signal may be changed arbitrarily as long as it is an AC signal, and may be, for example, a rectangular wave or a triangular wave signal. In addition, a direct current (DC) bias is applied to the AC signal so that the AC current, in other words, a fluctuating current flowing from the battery cell 42 does not become a negative current, in other words, a reverse current to the battery cell 42.

The modulation signal generator 53 subsequently converts the AC signal into a digital signal to generate an instruction signal, and instructs (outputs) the AC generation unit 51 to generate the alternating current based on the instruction signal.

The arithmetic processing unit 54 includes a microcomputer including a CPU and a storage device, and implements various functions by executing programs stored in the storage device. The CPU corresponds to an arithmetic unit, and a storage device corresponds to various types of memory. Various functions may be implemented by an electronic circuit that is hardware, or may be implemented by both hardware and software.

The arithmetic processing unit 54 has a function of calculating the complex impedance of the battery cell 42. The arithmetic processing unit 54 may also be referred to as a calculation unit or a calculator. The following describes a method for calculating the complex impedance. The arithmetic processing unit 54 instructs the modulation signal generator 53 about the measurement frequency of the complex impedance. The modulation signal generator 53 causes the battery cell 42 to generate the alternating current corresponding to the fluctuating current via the AC generation unit 51 based on the instruction from the arithmetic processing unit 54. The voltage response measurement unit 52 measures the voltage across the terminals of the battery cell 42, measures a response signal corresponding to voltage fluctuation in response to the input signal corresponding to the alternating current, and outputs the measured response signal to the arithmetic processing unit 54.

The arithmetic processing unit 54 calculates information related to the complex impedance of the battery cell 42 based on the response signal. The arithmetic processing unit 54 repeats the series of processes until complex impedances are calculated for multiple predetermined measurement frequencies within the measurement range. Additionally, the arithmetic processing unit 54 notifies the battery control ECU 70 of the calculated result. Moreover, the arithmetic processing unit 54 stores the calculated result in a memory 54a.

The battery control ECU 70 creates, for example, a complex impedance plane plot, in other words, a Cole-Cole plot based on the calculated result, and acquires the characteristics of, for example, the electrode and the electrolyte. Also, the state of charge (SOC) and the state of health (SOH) are grasped.

However, it is not necessary to create the entire Cole-Cole plot, and attention may be paid to a part of the Cole-Cole plot. For example, the complex impedance at a specific frequency may be measured at regular time intervals while the vehicle is running, and changes in SOC, SOH, battery temperature, and the like during the running of the vehicle may be acquired based on a change in the complex impedance over time at the specific frequency. Alternatively, the complex impedance at a specific frequency may be measured at time intervals such as every day, every week, or every year, and a change in SOH or the like may be acquired based on a change in the complex impedance over time at the specific frequency. The complex impedance plane plot is not limited to the Cole-Cole plot. For example, a Bode plot can also be used.

In order to ensure the measurement precision of the complex impedance, it is necessary to average the measured values of voltage fluctuations into integrated values to suppress errors. For each AC signal at the measurement frequency, a wavenumber to some extent is output and it is necessary to measure a voltage fluctuation during this period. In other words, when the requested precision is predetermined, it is necessary to output the AC signal with a wave number according to the precision. If the measurement frequency differs, the wave number per unit time also differs. Therefore, if the measurement frequency is a low frequency, it will be necessary to output the alternating current for a longer period of time as compared with a situation in which the measurement frequency is a high frequency. That is, the required output period differs for each measurement frequency.

For example, as shown in FIG. 3, the battery control ECU 70 measures the complex impedance in the first measurement mode in which the measurement accuracy is low in a normal state, and determines that the battery cell 42 has a fault based on the measured result. Then, the complex impedance is measured by switching to the second measurement mode being higher in the measurement precision than the first measurement mode. That is, the complex impedance is normally measured in the first measurement mode with low measurement precision. When it is determined that the battery cell 42 has a fault, the complex impedance is measured in the second measurement mode in detail. The complex impedance may also be referred to as a correlation parameter. The first measurement mode may also be referred to as a second mode. The second measurement mode may also be referred to as a first mode. The timing for measuring the complex impedance in the first measurement mode is arbitrary. For example, the complex impedance is measured in the first measurement mode periodically. Further, the complex impedance may be measured in the second measurement mode immediately after the battery cell 42 is determined to have a fault in the first measurement mode, or the complex impedance may be measured in the second measurement mode after the elapse of a predetermined time from a situation in which the battery cell 42 is determined to have a fault.

Specifically, the arithmetic processing unit 54 determines the output period of the AC signal based on the set measurement frequency. The output period is a period until the wave number of the AC signal is output with a predetermined number of times, and is calculated based on the measurement frequency. The predetermined number of times indicating the number of times of the wave number is determined in advance according to the required measurement precision.

For example, as shown in FIG. 4, the predetermined number of times is "3" in the first measurement mode, and "9" in the second measurement mode. The predetermined number of times in the first measurement mode corresponds to a second cumulative occurrence or a second cumulative measurement, and the predetermined number of times in the second measurement mode corresponds to a first cumulative occurrence a first cumulative measurement. The predetermined number of times in the second measurement mode is greater than the predetermined number of times in the first measurement mode. The number of times of outputting the AC current through the AC generation unit 51 and measuring a voltage change of the battery cell 42 through the voltage response measurement unit 52 differs in the first measurement mode and the second measurement mode. In other words, the method of measuring the complex impedance differs between the first measurement mode and the second measurement mode. Therefore, the measurement time in the second measurement mode is longer than the measurement time in the first measurement mode. The measurement precision in the second measurement mode is higher than the measurement precision in the first measurement mode. The power consumption of the battery cell 42 in the first measurement mode is less than the power consumption of the battery cell 42 in the second measurement mode. The "number of times" described in the present disclosure may also be referred to as "number of occurrences" or "number of measurements".

The arithmetic processing unit 54 subsequently instructs the modulation signal generator 53 about the set measurement frequency. The modulation signal generator 53 sets the frequency of the AC signal to be output to the oscillator according to the instructed measurement frequency. Then, the oscillator of the modulation signal generator 53 generates the AC signal according to the set measurement frequency. The modulation signal generator 53 converts the analog signal of the generated AC signal into a digital signal, and outputs an instruction signal for outputting the AC signal to the AC generation unit 51.

The alternating current generation unit 51 provides the alternating current as an input signal to the battery cell 42 based on the instruction signal, and causes the battery cell 42 to output the alternating current being the fluctuating current. The voltage response measurement unit 52 measures the voltage across the terminals of the battery cell 42, measures a response signal corresponding to voltage fluctuation in response to the input signal corresponding to the alternating current, and converts the analog value of the measured response signal to the digital value and then output the converted digital value to the arithmetic processing unit 54. The alternating current generation unit 51 may provide the alternating current being the fluctuating current to the battery cell 42 or may vary the load on the battery cell 42.

The arithmetic processing unit 54 calculates information related to the complex impedance of the battery cell 42 based on the alternating current and voltage change. Specifically, the arithmetic processing unit 54 acquires the measured value of the alternating current. In other words, the alternating current flowing through the first electrical path 81 is measured, and the measured alternating current is analyzed according to the frequency of each AC signal as the measurement frequency. Each AC signal as a measurement signal actually flowing through the first electrical path 81 is extracted and obtained.

The arithmetic processing unit 54 subsequently analyzes the response signal based on the acquired AC signal, and calculates a value proportional to the real part and a value proportional to the imaginary part of the response signal as the information related to the complex impedance. The value proportional to the real part and the value proportional to the imaginary part of the response signal are average values, in other words, integrated values from the start of outputting each AC signal.

Next, the arithmetic processing unit 54 determines whether or not the output period of the AC signal according to each measurement mode has ended. In the first measurement mode, the output period is a period until three AC signals are output. In the second measurement mode, the output period is a period until nine AC signals are output. If the determination result is negative, the arithmetic processing unit 54 continues measurement and calculation. On the other hand, if the determination result is affirmative, the arithmetic processing unit 54 stops the generation of the AC signal.

The arithmetic processing unit 54 acquires the values proportional to the real part and the imaginary part of the response signal corresponding to the AC signal, and calculates all or any of the absolute values and the phases of the complex impedance at the measurement frequency of the AC signal based on the acquired values. Then, the arithmetic processing unit 54 transmits the calculated complex impedance to the battery control ECU 70 via the communication unit 55. In other words, the arithmetic processing unit 54 notifies the battery ECU 70 of the calculated complex impedance via the communication unit 55.

Figure 5:
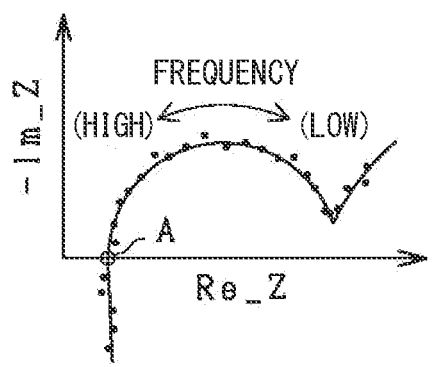
FIG. 5 is a graph showing a complex impedance plane plot and a zero-crossing point.

FIG. 5 is a graph showing a complex impedance plane plot and a zero-crossing point. The zero-crossing point may also be simply referred to as a zero-crossing. The battery measurement unit 50 periodically measures the complex impedance of the battery cell 42 while changing the measurement frequency at the time during which the vehicle equipped with the power supply system 10 is running (in other words, the battery pack 40 is in operation), and then creates the complex impedance plane plot. The horizontal axis of the graph represents the real part of the complex impedance, and the vertical axis of the graph represents the imaginary part of the complex impedance. The zero-crossing point is a point where the complex impedance graph intersects the horizontal axis, that is, the point where the value of the imaginary part of the complex impedance reaches zero.

Black dots in the figure represent complex impedance measurements over a wide range of frequencies from low to high frequencies. The diameter of the real part of the arc mainly represents a reaction resistance being a resistance when the molecule exits the electrode into the solution (electrolyte) in the battery cell 42. The real part at the zero-crossing point A indicated by a white circle mainly represents a solution resistance being a resistance when charges move into the solution in the battery cell 42. The inventors of the present application have noticed that, when the battery cells 42, in other words, the battery module 41 and the battery pack 40 undergo thermal runaway, gasification of the solution occurs and the real part of the zero-crossing point A rapidly increases.

Figure 6:
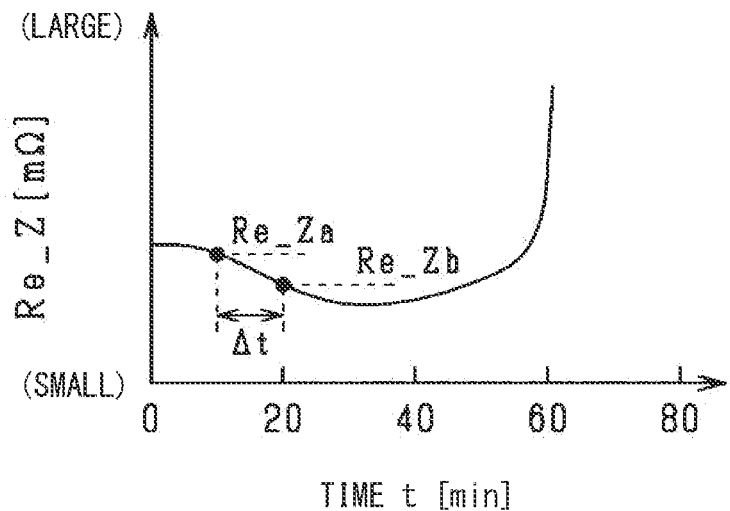
FIG. 6 is a graph showing the relationship between the time during thermal runaway and the real part of the zero-crossing point.

FIG. 6 is a graph showing the relationship between the time t and the real part Re_Z of the zero-crossing point during thermal runaway of the battery cell 42. Before the thermal runaway of the battery cell 42 occurs, the real part Re_Z (mΩ) of the zero-crossing point becomes, for example, Re_Za (mΩ) or Re_Zb (mΩ), and hardly changes. Then, when the battery cell 42 has thermal runaway, the real part Re_Z of the zero-crossing point increases rapidly. The real parts Re_Za and Re_Zb of the zero-crossing point are converted values acquired by converting the real part Re_Z of the zero-crossing point calculated at the present temperature and the present SOC of the battery cell 42 to the real part of the zero-crossing point in a case where: the temperature T of the battery cell 42 is a predetermined temperature; and the SOC of the battery cell 42 is predetermined state of charge (predetermined SOC). The reason for converting the real part Re_Z of the zero-crossing point to the converted value is that the complex impedance of the battery cell 42 is affected by the temperature T and SOC of the battery cell 42, and the real part of the zero-crossing point is also affected by the temperature T and SOC of the battery cell 42.

Figure 7:
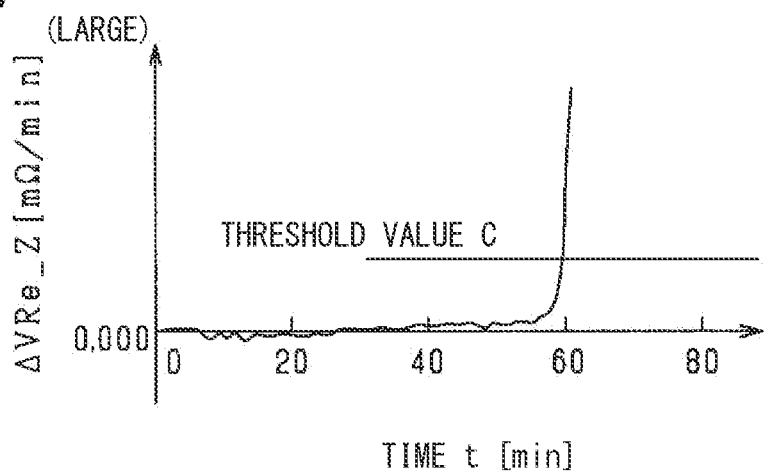
FIG. 7 is a graph showing the relationship between the time during thermal runaway and a rate of change in the real part of the zero-crossing point.

FIG. 7 is a graph showing the relationship between the time t during the thermal runaway of the battery cell 42 and a rate of change ΔVRe_Z in the real part Re_Z of the zero-crossing point. The rate of change ΔVRe_Z in the real part Re_Z of the zero-crossing point can be calculated by dividing the amount of change ΔRe_Z in the real part Re_Z of the zero-crossing point by the time Δt required for the change (ΔVRe_Z=ΔRe_Z/Δt).

For example, when the real part Re_Z milliohm (mΩ) of the zero-crossing point changes from Re_Za milliohm (mΩ) to Re_Zb milliohm (mΩ) in time Δt minute (min), the rate of change ΔVRe_Z (mΩ/min) in the real part Re_Z of the zero-crossing point is equal to (Re_Zb−Re_Za)/Δt. When the battery cell 42 has thermal runaway, the rate of change ΔVRe_Z in the real part Re_Z of the zero-crossing point increases rapidly in the previous stage. That is, as a sign of thermal runaway of the battery cells 42, in other words, the battery module 41 and the battery pack 40, the rate of change ΔVRe_Z in the real part Re_Z at the zero-cross point is rapidly increasing. In the present embodiment, when the rate of change ΔVRe_Z in the real part Re_Z of the zero-crossing point exceeds the threshold value C (in other words, the rate of change ΔVRe_Z is greater than the threshold C), it is detected that there is a sign of thermal runaway in the battery cell 42.

The thermal runaway of the secondary battery such as the battery cell 42 does not only occur during the operation of the secondary battery (during charging and discharging), but also may also occur during the stoppage of the operation of the second battery (during non-activating or during disconnection from an electric load). For example, it may be desirable to detect the sign of thermal runaway even during the stop of the vehicle. In other words, it may be desirable to detect the sign of thermal runaway in a situation where the battery cell 42 stops operation and the battery control ECU 70 or the like is in the sleep state.

If the battery control ECU 70 is activated after a certain period of time has elapsed since the start of the sleep state, it may not be possible to properly detect the sign of thermal runaway due to the activation time. In other words, if the sleep state is lengthened, the thermal runaway may occur during that time. On the other hand, power consumption cannot be suppressed if the sleep state is shortened and frequently activated.

In the present embodiment, the sleep state is activated after the elapse of a certain period of time from the start of the sleep state, and the battery control ECU 70 in the sleep state is activated in a case where some kind of unusual change has occurred in the battery cell 42 even though it cannot be said that the fault has actually occurred in the battery cell 42.

This will be described below in detail. The battery control ECU 70 has a sleep function that shifts to the sleep state at a predetermined timing. The predetermined timing is, for example, the timing at which an ignition switch is turned off or the timing at which a certain period of time has elapsed since the vehicle stops. In addition, the battery control ECU 70 has an activation instruction circuit 75. The activation instruction circuit 75 is a circuit that issues an activation instruction to the battery control ECU 70 when the elapsed time after shifting to the sleep state exceeds a preset activation time. The activation time described in the present disclosure may also be referred to as a start-up time. The activation instruction described in the present disclosure may also be referred to as a start-up instruction. The activation described in the present disclosure may also be referred to as start-up. The activation instruction circuit 75 may also be referred to as a start-up instruction circuit.

On the other hand, the battery measurement unit 50 receives power supply from, for example, the battery cell 42 and continues to be driven at all times to continuously measure the battery state such as voltage or complex impedance. That is, the battery measurement unit 50 does not enter the sleep state. The power consumption of the battery measurement unit 50 is smaller than the power consumption of the battery control ECU 70. This is because performance and processing such as processing capacity are different between the battery measurement unit 50 and the battery control ECU 70.

The arithmetic processing unit 54 of the battery measurement unit 50 may also determine whether or not the battery control ECU 70 is in the sleep state. For example, the arithmetic processing unit 54 determines whether or not the battery control ECU 70 is in the sleep state, based on whether or not the clock circuit operated in the sleep state of the battery control ECU 70 is operating.

When the battery measurement unit 50 determines that the battery control ECU is in the sleep state, in a case of measuring, for example, the measured value indicating the battery state, the battery measurement unit 50 stores the measured result such as the measured value into the memory 54a. However, the measured value or the like may be stored into the memory 54a regardless of being in the sleep state or not. In the present embodiment, the battery measurement unit 50 stores, for example, the measured voltage value, complex impedance, current value, and battery temperature. However, for example, the gas pressure inside the battery and the type of generated gas may also be stored. Each measured value is then stored over time. That is, each measured value is stored as historical data.

The battery measurement unit 50 includes an activation signal output circuit 57 as an activation signal output unit for outputting an activation signal. The activation signal described in the present disclosure may also be referred to as a start-up signal. The activation signal output circuit 57 may also be referred to as a start-up signal output circuit. When it is determined that the battery control ECU 70 is in the sleep state, the arithmetic processing unit 54 determines whether or not to output the activation signal based on the measured value. If it is determined to output the activation signal, the arithmetic processing unit 54 controls the activation signal output circuit 57 to output the activation signal.

In the present embodiment, when it is determined that the battery control ECU 70 is in the sleep state, the arithmetic processing unit 54 refers to the historical data stored in the memory 54a to calculate the amount of voltage change per unit time. When the amount of voltage change is greater than or equal to a predetermined value, the arithmetic processing unit 54 determines that some kind of unusual change may occur in the battery cell 42 and controls the activation signal output circuit 57 to output the activation signal.

Although the possibility of the unusual change is determined based on the amount of voltage change, the possibility of unusual change may be determined based on the amount of change in a measured value other than the amount of voltage change. For example, it may be determined that unusual change may occur based on the complex impedance, the battery temperature, or the amount of change in the gas pressure. Other than the amount of change, it may be determined that unusual change may occur in a case where the measured value itself is larger than or equal to a predetermined value. For example, in a case where the battery temperature is higher than or equal to a predetermined temperature, it may be determined that unusual change may occur. Further, the possibility of unusual change may be determined from two or more measured values or amounts of change, or from a single measured value and a single amount of change.

The predetermined value may be set from a value within the boundary range between a normal range and an abnormal range. That is, it may be desirable to set a value within a range in which it is difficult to distinguish between the normal range and the abnormal range as the predetermined value so that the possibility of unusual change can be detected. It is needless to say that the activation signal is output when it is within the abnormal range.

When the battery control ECU 70 receives the activation signal from the battery measurement unit 50 or receives the activation instruction from the activation instruction circuit 75, the battery control ECU 70 is activated and performs various processes. The various processes include a detection process for detecting the sign of thermal runaway. As another example, the activation signal may be provided to the activation instruction circuit 75 to cause the activation instruction circuit 75 to execute the activation instruction for activating the battery control ECU 70.

Figure 8:
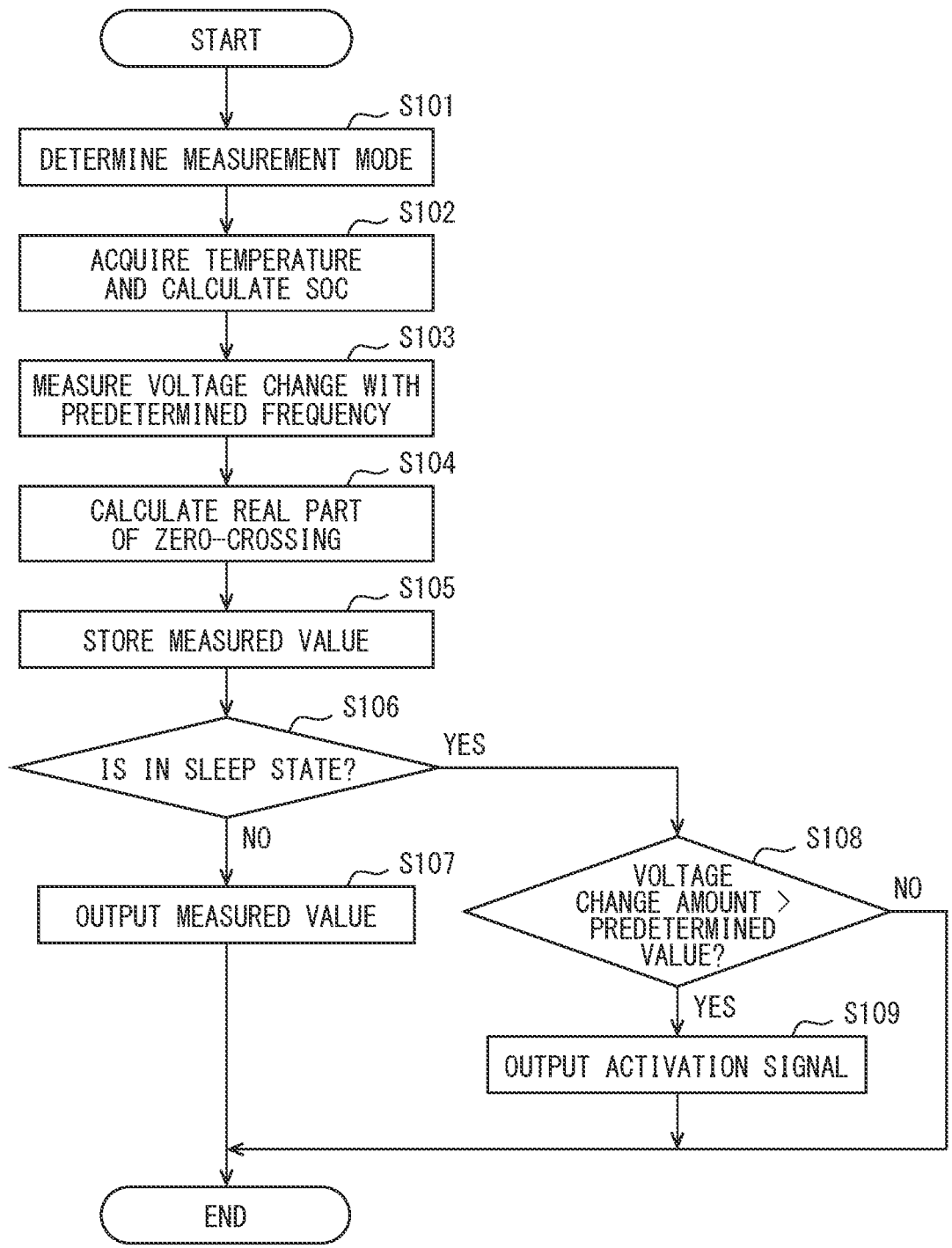
FIG. 8 is a time chart showing a measurement process.

Next, a measurement process is described with reference to FIG. 8. The measurement process is executed by the battery measurement unit 50 at predetermined intervals. This measurement process is normally executed while the battery measurement unit 50 is in operation, regardless of whether the battery control ECU 70 is in the sleep state or not. In the measurement process, a process for activating the battery control ECU 70 in the sleep state is also executed.

The battery measurement unit 50 determines the set measurement mode in S101. The measurement mode determines whether the measurement mode set by the instruction from the mode switchover unit 71 of the battery control ECU 70 is the first measurement mode or the second measurement mode.

The battery measurement unit 50 measures various measured values in the set measurement mode in S102 to S104. Specifically, the battery measurement unit 50 acquires the temperature T of the battery cell 42 and calculates the SOC of the battery cell 42 in S102. The temperature T of the battery cell 42 can be acquired, for example, based on the output of, for example, a thermistor attached to the battery cell 42, in other words, the battery module 41 and the battery pack 40. The SOC of the battery cell 42 can be calculated based on, for example, the SOC at a predetermined time point and the integrated value of the current flowing through the battery cell 42 after the predetermined time.

Subsequently, the battery measurement unit 50 causes the battery cell 42 to output the alternating current, in other words, the fluctuating current with a predetermined frequency, and measures the voltage change of the battery cell 42 in response to the alternating current in S103. The predetermined frequency is the measurement frequency at which the imaginary part of the complex impedance of the battery cell 42 calculated based on the voltage change of the battery cell 42 reaches zero. In other words, the predetermined frequency is at which the graph of the complex impedance intersects the horizontal axis. For example, the predetermined frequency is the measurement frequency at the zero-crossing point A in the Cole-Cole plot as illustrated in FIG. 5. It is possible to calculate the predetermined frequency based on, for example, an experiment adopting the battery cell 42. The measurement of voltage change is executed in a state where the mode is switched to the measurement mode set in S101.

Subsequently, the battery measurement unit 50 calculates the real part of the zero-crossing point based on the alternating current and voltage fluctuation in S104. The method of calculating the real part of the zero-crossing point is the same as the method of calculating information about the complex impedance of the battery cell 42 based on the alternating current and voltage fluctuation, as described above.

Then, the battery measurement unit 50 stores various measured values being measured results in the memory 54a in S105. Next, the battery measurement unit 50 determines whether or not the battery control ECU 70 is in the sleep state in S106. If the determination result is negative, the battery measurement unit 50 outputs or transmits the measured values such as information related to the complex impedance to the battery control ECU 70 in S107. Then, the measurement process is terminated in END.

On the other hand, if the determination result in step S106 is affirmative, the battery measurement unit 50 calculates the amount of change in the voltage value per unit time, and determines whether or not the amount of change is greater than a predetermined value in S108. The unit time is arbitrary. The unit time may be, for example, 1 to 5 (min). The amount of change may be calculated from the historical data of voltage values stored in the memory 54a. At that time, it is desirable that the amount of change is the latest. When the determination result in S108 is affirmative, the battery measurement unit 50 causes the activation signal output circuit 57 to output the activation signal in S109. Then, the measurement process is terminated in END. On the other hand, if the determination result in S108 is negative, the battery measurement unit 50 terminates the measurement process in END.

The following describes the process executed by the battery control ECU 70 while the ignition switch is being turned on, in other words, the battery control ECU 70 is not in the sleep state.

The battery control ECU 70 periodically grasps the characteristics of the battery cell 42 based on the information related to the complex impedance of the battery cell 42 measured by the battery measurement unit 50. For example, the battery control ECU 70 periodically measures the complex impedance in the first measurement mode set by the battery measurement unit 50. If it is determined that the battery cell 42 has a fault based on the measured result being the measured value of the complex impedance, the battery measurement unit 50 switches from the first measurement mode to the second measurement mode to that the battery control ECU 70 measures the complex impedance in the second measurement mode. Then, the battery control ECU 70 creates a complex impedance plane plot based on the measured complex impedance, and grasps the characteristics of the electrodes and the electrolyte as well as the state of charge (SOC) or the state of health (SOH).

The following describes a detection process for detecting the sign of thermal runaway after the activation of the battery control ECU 70. The detection process is executed when the battery control ECU 70 is activated from the sleep state. Specifically, the detection process is executed when the activation instruction is provided from the activation instruction circuit 75 or the activation signal is received and activated during the sleep state.

After starting the detection process, the battery control ECU 70 switches the measurement mode of the battery measurement unit 50 in S201. In S201, the measurement mode is switched to the first measurement mode regardless of the input of the activation signal when the measurement is executed for the first time after being activated from the sleep state. In S201, when the battery control ECU 70 is activated by an instruction provided from the activation instruction circuit 75, the battery control ECU 70 switches the measurement mode to the first measurement mode and provides the activation signal to activate the battery control ECU 70. In some cases, the battery control ECU 70 may be switched to the second measurement mode. The first measurement mode described above corresponds to a second mode, and the second measurement mode described above corresponds to a first mode.

As described in the detection process, the battery measurement unit 50 acquires various types of the measured values and outputs the measured values to the battery control ECU 70. In other words, the battery measurement mode 50 acquires the temperature T of the battery cell 42, and calculates the SOC of the battery cell 42. The battery measurement unit 50 calculates the real part of the zero-crossing point based on the alternating current and voltage change. Then, the battery measurement unit 50 outputs or transmits various types of acquired or calculated measured values to the battery control ECU 70. Then, the battery control ECU 70 receives an input of the measured value as the measured result from the battery measurement unit 50 in S202.

Subsequently, the battery control ECU 70 standardize the received real part of the zero-crossing point in S203. Specifically, the battery control ECU 70 calculates a converted value acquired by converting the real part of the zero-crossing point calculated by the battery measurement unit 50 to the real part of the zero-crossing point in a situation where the temperature T of the battery cell 42 is a predetermined temperature and the SOC of the battery cell 42 is a predetermined state of charge (predetermined SOC). This converted value can be calculated by applying the temperature T of the battery cell 42 and the SOC of the battery cell 42 acquired in S202 to a map or formula that defines the relationship among, for example, the temperature T of the battery cell 42, the SOC of the battery cell 42 and the real part of the zero-crossing point. For example, 25 degree Celsius (° C.) can be used as the predetermined temperature, and 90% can be used as the predetermined SOC. The map and formula can be calculated in advance based on an experiment in which, for example, the battery cell 42 is adopted.

Subsequently, the battery control ECU 70 receives an input of the measured value from the battery measurement unit 50 after the predetermined time Δt elapsed from a timing at which the alternating current with a predetermined frequency is output from the battery cell 42 to measure the voltage change of the battery cell 42 in a previous occasion. That is, the temperature T of the battery cell 42 after the predetermined time Δt, the SOC of the battery cell 42, and the information on the complex impedance (the real part of the zero-crossing point) are acquired. The predetermined time Δt is, for example, 1 to 5 minutes (min). The predetermined time Δt may be a time elapsed from a situation where the temperature T of the battery cell 42 was obtained in the last occasion and the SOC of the battery cell 42 was calculated.

Subsequently, the battery control ECU 70 standardizes the received real part of the zero-crossing point after the predetermined time Δt in S205, as in S203. Then, the battery control ECU 70 calculates the rate of change in the real part of the zero-crossing point in S206. For example, the amount of change ΔRe_Z (difference in converted value) from the converted value Re_Za of the real part of the zero-crossing point calculated in the last occasion to the converted value Re_Zb of the real part of the zero-crossing point calculated after a predetermined time Δt is divided by the predetermined time Δt. Then, the rate of change ΔVRe_Z in the real part of the zero-crossing point is calculated (in other words, ΔVRe_Z=ΔRe_Z/Δt).

Subsequently, the battery control ECU 70 determines whether or not the rate of change ΔVRe_Z of the real part of the zero-crossing point is greater than the threshold value C in S207. In this determination, if it is determined that the rate of change ΔVRe_Z of the real part of the zero-crossing point is not greater than the threshold value C (S207: NO), the battery control ECU 70 instructs the activation instruction circuit 75 to set the activation time until the next activation in S208. In S208, in a case where the battery control ECU 70 receives the activation signal to be activated, the activation time may be set shorter as compared with a situation where the battery control ECU 70 receives the instruction of activation from the activation instruction circuit 75. In other words, if the sign of thermal runaway could not be detected even though the battery cell 42 was activated due to the possibility of some kind of unusual change, the activation time may be shortened so that the detection can be executed again immediately. For example, the activation time may be set to 1 hour when the battery control ECU 70 is activated by the instruction of the activation instruction circuit 75, and may be set to 30 minutes when the battery control ECU 70 is activated by the reception of the activation signal.

On the other hand, in the determination executed in S207, in a case where the rate of change ΔVRe_Z in the real part of the zero-crossing point is greater than the threshold value C (S207: YES), the battery control ECU 70 notifies the host ECU 60 of the sign of thermal runaway in the battery cell 42 in S210. That is, the battery control ECU 70 detects that there is a sign of thermal runaway in the battery cell 42 and notifies the host ECU 60 of the sign of thermal runaway, that is, a fault in the battery cell 42 through communication. Upon receiving the notification, the host ECU 60 notifies a vehicle driver of the fault by, for example, an alarm. The host ECU 60 may receive the notification and notify, for example, a monitor center, which is capable of executing communication with the vehicle, of the fault. Then, the series of processing described above is terminated in END.

S108 and S109 correspond to activation-signal output processing, and the detection process corresponds to detection processing. The battery control ECU 70 functions as the mode switchover unit 71 through S201. Further, the battery control ECU 70 functions as the TR detection unit 72 through S202 to S207.

Figure 10:
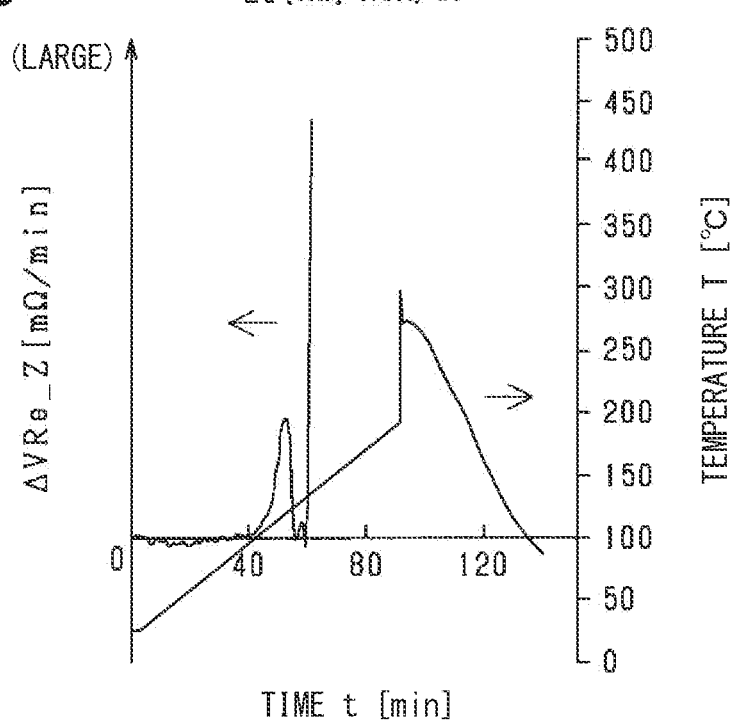
FIG. 10 is a graph showing the relationship among the time during the thermal runaway of the battery cell with a capacity of 25 Ampere-hour (Ah), the rate of change in the real part of the zero-crossing point, and the temperature.
Figure 11:
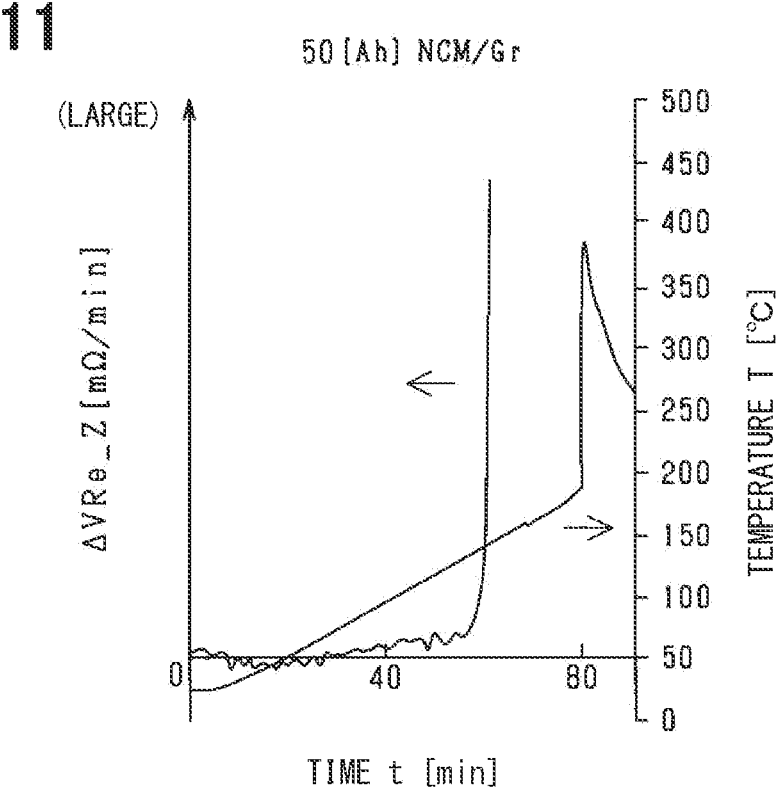
FIG. 11 is a graph showing the relationship among the time during the thermal runaway of the battery cell with a capacity of 50 Ampere-hour (Ah), the rate of change in the real part of the zero-crossing point, and the temperature.
Figure 12:
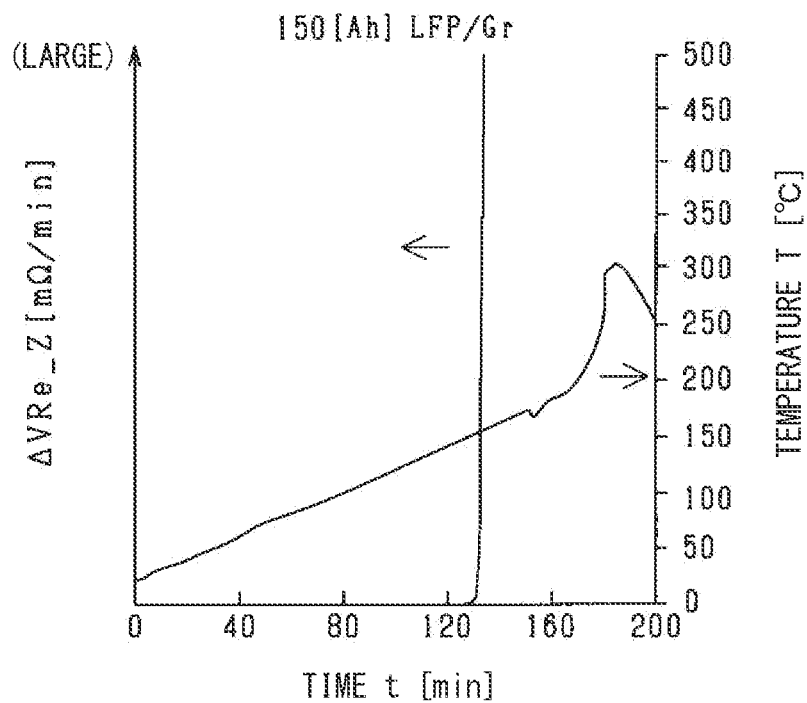
FIG. 12 is a graph showing the relationship among the time during the thermal runaway of the battery cell with a capacity of 150 Ampere-hour (Ah), the rate of change in the real part of the zero-crossing point, and the temperature.

Each of the graphs in FIGS. 10 to 12 illustrates the relationship among the time t, the rate of change $\Delta VRe\_Z$ (left axis) in the real part of the zero-crossing point, and the temperature T (right axis) during thermal runaway of battery cells with different capacities. The SOC of each battery cell is adjusted to 90%, and the temperature of each battery cell is simulated to rise at a constant rate. FIG. 10 illustrates a battery cell having a capacity of 25 Ampere-hour (Ah), a positive electrode made of nickel-based material NCM (nickel, cobalt, aluminum, manganese) and a negative electrode made of graphite (Gr). FIG. 11 illustrates a battery cell having a capacity of 50 Ampere-hour (Ah), a positive electrode made of nickel-based material NCM, and a negative electrode made of Gr. FIG. 12 illustrates a battery cell having a capacity of 150 Ampere-hour (Ah), a positive electrode of lithium, iron, phosphorus and a negative electrode of Gr.

The imaginary part of the complex impedance of the battery cell 42 reaches 0 at the predetermined frequency, that is, the measurement frequency. In other words, the graph of the complex impedance intersects the horizontal axis at the measurement frequency. The measurement frequency differs according to the capacity of each battery cell. For example, the predetermined frequency of the battery cell in FIG. 10 is 400 hertz (Hz). The predetermined frequency of the battery cell in FIG. 11 is 250 hertz (Hz). The predetermined frequency of the battery cell in FIG. 12 is 120 hertz (Hz). Thus, the predetermined frequency tends to decrease as the capacity of the battery cell increases. Although there is such a difference, in any of FIGS. 10 to 12, the rate of change $\Delta VRe\_Z$ in the real part of the zero-crossing point rapidly rises earlier than the time when the battery cell has the thermal runaway and the temperature rapidly rises.

Therefore, by monitoring the rate of change $\Delta VRe\_Z$ in the real part of the zero-crossing point, it is possible to detect the sign of thermal runaway of the battery cell 42 before the thermal runaway occurs. The battery cell in FIG. 10 has a vent valve that discharges the internal gas when the internal pressure becomes abnormally high. Although the rate of change $\Delta VRe\_Z$ drops once, the rate of change $\Delta VRe\_Z$ rises rapidly before the battery cell undergoes thermal runaway.

As shown in FIGS. 10 to 12, the complex impedance changes before the thermal runaway occurs, so it is obvious that the voltage value also changes. Therefore, if the voltage value changes significantly, it is obvious that some kind of unusual change may occurred.

The present embodiment described above in detail has the following advantageous effects.

When the battery control ECU 70 is in the sleep state, the battery measurement unit 50 determines whether or not to output an activation signal based on the measured value, and outputs the activation signal when the determination result is affirmative. When the battery control ECU 70 is in the sleep state, the battery control ECU 70 is activated by the reception of the activation signal from the battery measurement unit 50, performs arithmetic processing on the measured value received from the battery measurement unit 50, and detects the sign of thermal runaway based on the measured value. As a result, even if the battery control ECU 70 is in the sleep state, if there is a possibility that some kind of unusual change has occurred in the battery cell 42, the possibility is detected, and the battery control ECU 70 can appropriately detect the sign of thermal runaway. Additionally, the battery controller can be set in the sleep state to suppress the power consumption until some kind of unusual change occurs in the battery state.

When the battery control ECU 70 is in the sleep state, the arithmetic processing unit 54 of the battery measurement unit 50 outputs an activation signal if the amount of voltage change per unit time is greater than a predetermined value. As a result, the possibility of unusual change occurred in the battery cell 42 can be determined by simple processing with little computational load.

The activation time set in the activation instruction circuit 75 may be set shorter in a situation where the activation is executed based on the reception of the activation signal as compared with a situation where the activation is performed based on the activation instruction from the activation instruction circuit 75. In such a situation, since unusual change may occur in the battery cell 42 during the sleep state of the battery control ECU 70, the battery control ECU 70 can be again activated to execute the detection again in a short time in a case where the sign of thermal runaway cannot be detected, regardless of whether or not the battery control ECU 70 is activated based on the reception of the activation signal. That is, even if the sign of thermal runaway could not be detected due to, for example, a measurement error, the sign can be detected again.

The sign of thermal runaway is detected through the rate of change in the real part of the AC impedance. Therefore, the sign of thermal runaway can be detected early as compared to a detection based on the rate of change in the voltage value or the battery temperature.

The modulation signal generator 53, the AC generation unit 51, and the voltage response measurement unit 52 of the battery measurement unit 50 can detect the voltage fluctuation through the second measurement mode and the first measurement mode. The second measurement mode corresponds to the first mode. The first measurement mode corresponds to the second mode. In the second measurement mode, the number of occurrences for causing the battery cell 42 to output the alternating current being a fluctuating current to measure the voltage change in the battery cell 42 in response to the alternating current is "9" being the first cumulative occurrence or the first cumulative measurement. In contrast, the number of occurrences in the first measurement mode is "3" being the second cumulative occurrence or the second cumulative measurement that is smaller than "9" being the first cumulative occurrence or the first cumulative measurement. When measuring the voltage fluctuation of the battery cell 42 in response to the AC current output from the battery cell 42, the power consumption of the battery cell 42 can be suppressed more in the first measurement mode than in the second measurement mode. The mode switchover unit 71 switches the modulation signal generator 53, the alternating current generation unit 51 and the voltage response measurement unit 52 to the first measurement mode, in a case where the battery control ECU 70 is in the sleep state, in other words, in a case where the battery cell 42 stops operation. The stoppage of the operation of the battery cell 42 includes a situation where the battery cell 42 is not being activated, or includes a situation where the battery cell 42 is isolated from the electric load. Therefore, even if the voltage of the battery cell 42 is measured while the battery cell 42 stops operation, the power consumption of the battery cell 42 can be suppressed.

The TR detection unit 72 calculates the rate of change ΔVRe_Z in the complex impedance real part Re_Z based on the complex impedance real part Re_Z and the predetermined time Δt calculated by the arithmetic processing unit 54. If the calculated rate of change ΔVRe_Z is greater than the threshold value C, the TR detection unit detects that there is a sign of thermal runaway in the battery cell 42. Therefore, it is possible to detect that the real part Re_Z of the zero-crossing point begins to increase rapidly due to gasification of the solution as the sign of thermal runaway of the battery cell 42. Moreover, there is no need to measure the complex impedance of the battery cell 42 at multiple frequencies within the measurement range. Since the complex impedance of the battery cell 42 may be measured the predetermined frequency at which the imaginary part of the complex impedance reaches 0, it is possible to further suppress the power consumption of the battery cell 42. The measurement of the voltage change of the battery cell 42 can also be performed in a short time. The duration of the short time is acquired by multiplying several to several tens milliseconds (ms) by the number of waves (in other words, number of times).

The TR detection unit 72 calculates the rate of change ΔVRe_Z in the real part Re_Z of the complex impedance based on the converted values Re_Za and Re_Zb and the predetermined time Δt. The converted values Re_Za and Re_Zb are acquired by converting the real part Re_Z of the complex impedance calculated by the arithmetic processing unit 54 into the real part of the complex impedance in a case where the temperature T of the battery cell 42 is the predetermined temperature and the state of charge (SOC) of the battery cell is the predetermined state of charge (predetermined SOC). With such a configuration, it is possible to accurately detect the sign of thermal runaway of the battery cell 42 in consideration of the influence of the temperature T and SOC of the battery cell 42 based on the real part Re_Z of the zero-crossing point.

(Modifications)

The embodiment described above may be modified in the following manners. The following describes modified examples. Parts same as the parts of the above embodiment are designated by the same reference signs as the above embodiment to omit redundant description.

In the embodiment described above, the host ECU 60 may cause the vehicle to perform an evacuation run when the host ECU 60 receives a notification of the sign of thermal runaway, in other words, a fault in the battery cell 42. The host ECU 60 may unlock the doors of the vehicle when receiving a notification of the sign of thermal runaway in the battery cell 42. This prevents the driver from opening the door of the vehicle in a hurry. Moreover, the battery control ECU 70 may shut down the battery pack 40, in other words, power supply system 10 when detecting the sign of thermal runaway in the battery cell 42. The power supply system 10 may also be adapted to an electric aircraft or an electric watercraft. Since it may be difficult for the driver to escape from the electric aircraft or electric watercraft in the event of a fault, it is important to shut down the battery pack 40.

Figure 9:
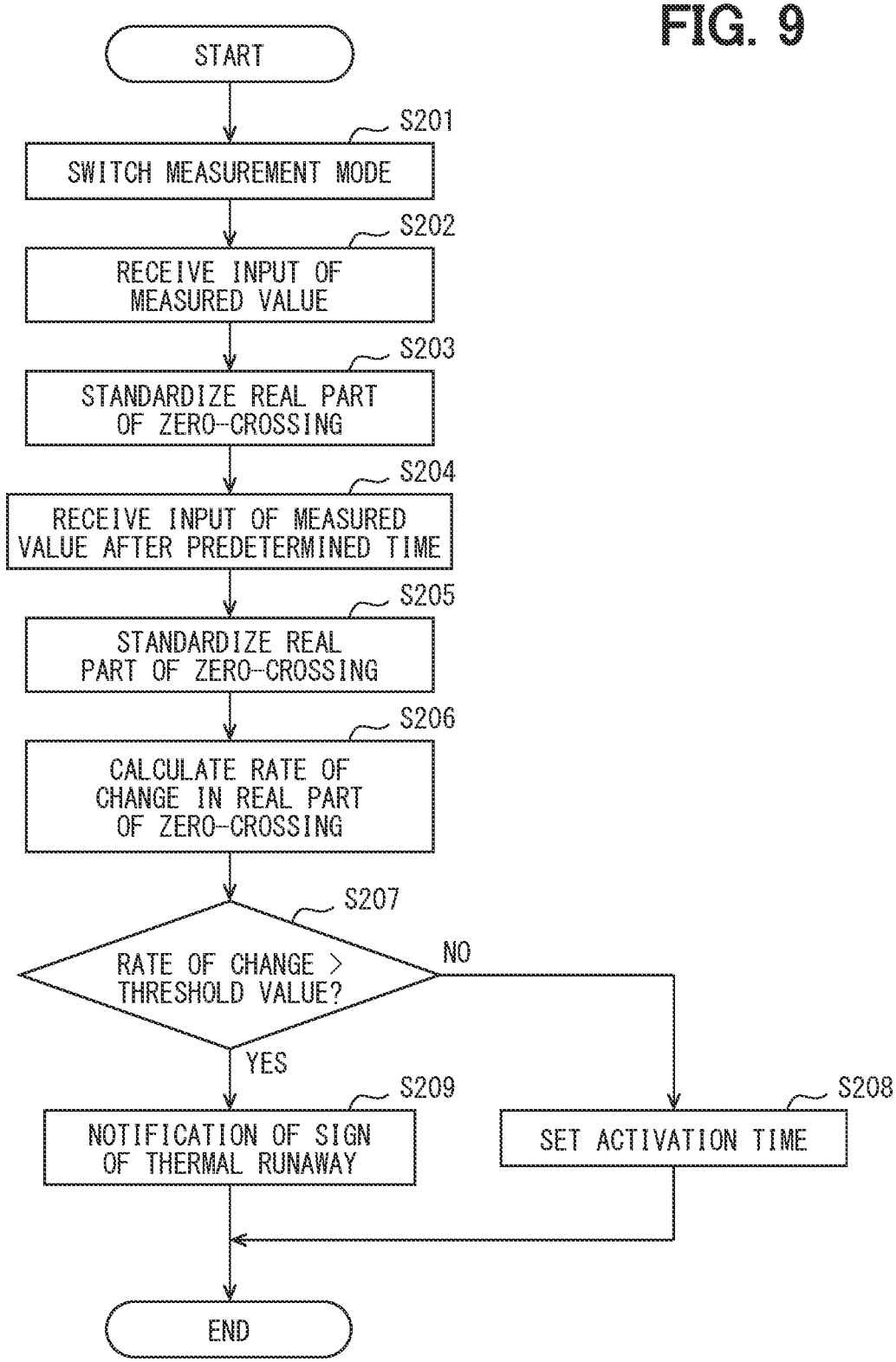
FIG. 9 is a flowchart showing a detection process for detecting a sign of thermal runaway of a battery cell.

In S207 illustrated in FIG. 9 according to the above-described embodiment, in addition to determining that the rate of change ΔVRe_Z in the real part of the zero-crossing point is greater than the threshold value C (S207: YES), the battery control ECU 70 may notify the host ECU 60 of the sign of thermal runaway in the battery cell 42 based on a condition that the temperature T of the battery cell 42 is higher than the determination temperature (for example, 60 degree Celsius (° C.)) in S209. According to such a configuration, it is possible to inhibit erroneous detection of the sign of thermal runaway in the battery cell 42 when the possibility of thermal runaway in the battery cell 42 is low.

The TR detection unit 72 according to the above-described embodiment may convert the rate of change in the real part Re_Z of the complex impedance based on the real part Rz_Z of the complex impedance and the predetermined time Δt, without converting the real part Rz_Z of the complex impedance calculated by the arithmetic processing unit 54 to the real part of the complex impedance at the predetermined temperature and the predetermined SOC. The TR detection unit 72 may subsequently detect the sign of thermal runaway in the battery cell 42 in a case where the calculated rate of change ΔVRe_Z is larger than the threshold value C.

In the first measurement mode, in other words, the second mode in the above-described embodiment, the magnitude, in other words, the amplitude of the alternating current, in other words, the fluctuating current output from the battery cell 42 may be set to be smaller than the magnitude of the alternating current output from the battery cell 42 in the second measurement mode, in other words, the first mode. Specifically, the arithmetic processing unit 54 causes the oscillator in the modulation signal generator 53 to generate the AC signal, such that the alternating current output from the battery cell 42 in the first measurement mode is smaller than the alternating current output from the battery cell 42 in the second measurement mode. The modulation signal generator 53 subsequently converts the AC signal into a digital signal to generate an instruction signal, and instructs the AC generation unit 51 to generate the alternating current based on the instruction signal or outputs an instruction signal to the AC generation unit 51 to generate the alternating current. With such a configuration, when measuring the voltage change of the battery cell 42 in response to the AC current output from the battery cell 42, the power consumption of the battery cell 42 can be suppressed more in the first measurement mode than in the second measurement mode.

The arithmetic processing unit 54 in the above-described embodiment may shorten the predetermined time Δt as the temperature T of the battery cell 42 increases in S204 illustrated in FIG. 9. The standby time, in other words, the predetermined time Δt elapsed from the output of the alternating current with a predetermined frequency to measure the voltage change of the battery cell 42 last occasion until a situation in which the temperature T of the battery cell 42 and the SOC of the battery cell 42 are acquired and the processing subsequent to S204 is executed may be shortened as the temperature T of the battery cell 42 rises. With such a configuration, the complex impedance is measured by the complex impedance in a shorter time interval as the temperature T of the battery cell 42 rises. Therefore, it is possible to detect the sign of thermal runaway in advance as the possibility of having thermal runaway in the battery cell 42 is relatively high.

In the battery measurement unit 50, in other words, the measurement unit according to the above embodiment may include a third measurement mode, in other words, a third mode, such that the number of occurrences of outputting the alternating current from the AC generation unit 51 and measuring the voltage change of the battery cell 42 through the voltage response measurement unit 52 in the third measurement mode differs from the first measurement mode and the second measurement mode. The first measurement mode corresponds to the second mode, and the second measurement mode corresponds to the first mode.

Figure 13:
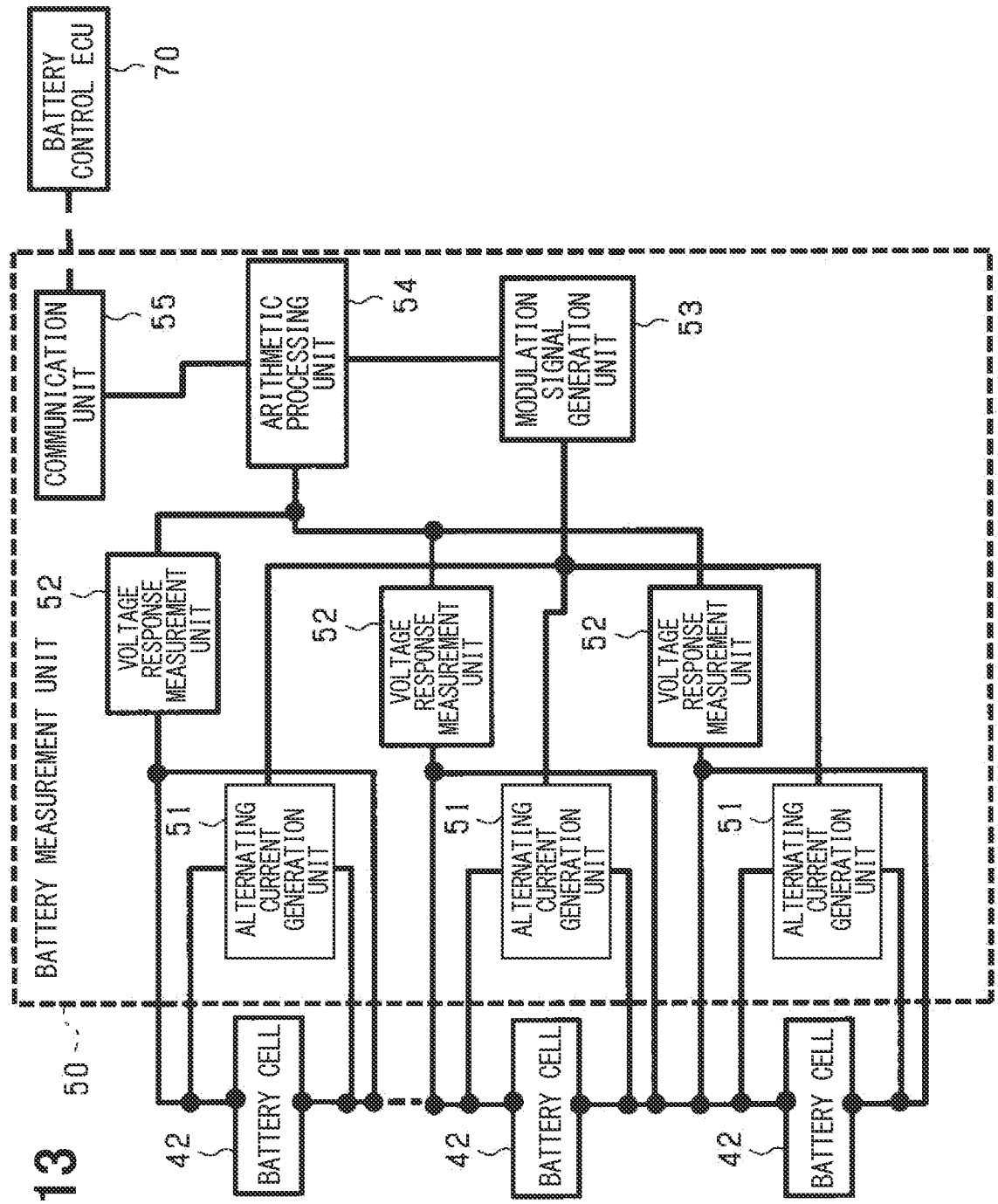
FIG. 13 is a block diagram of a battery measurement unit according to a modified example.

As illustrated in FIG. 13, the battery measurement unit 50 may include the AC generation unit 51 and the voltage response measurement unit 52 for each battery cell 42. When multiple battery cells 42 are set as the measurement targets, in other words, detection targets of the sign of thermal runaway, the alternating current may flow individually in each of the battery cells 42 or the alternating currents may flow in the multiple battery cells 42 at the same time to measure the voltage change of each of the battery cells 42 with the voltage response measurement unit 52 provided for each of the battery cells 42.

Figure 14:
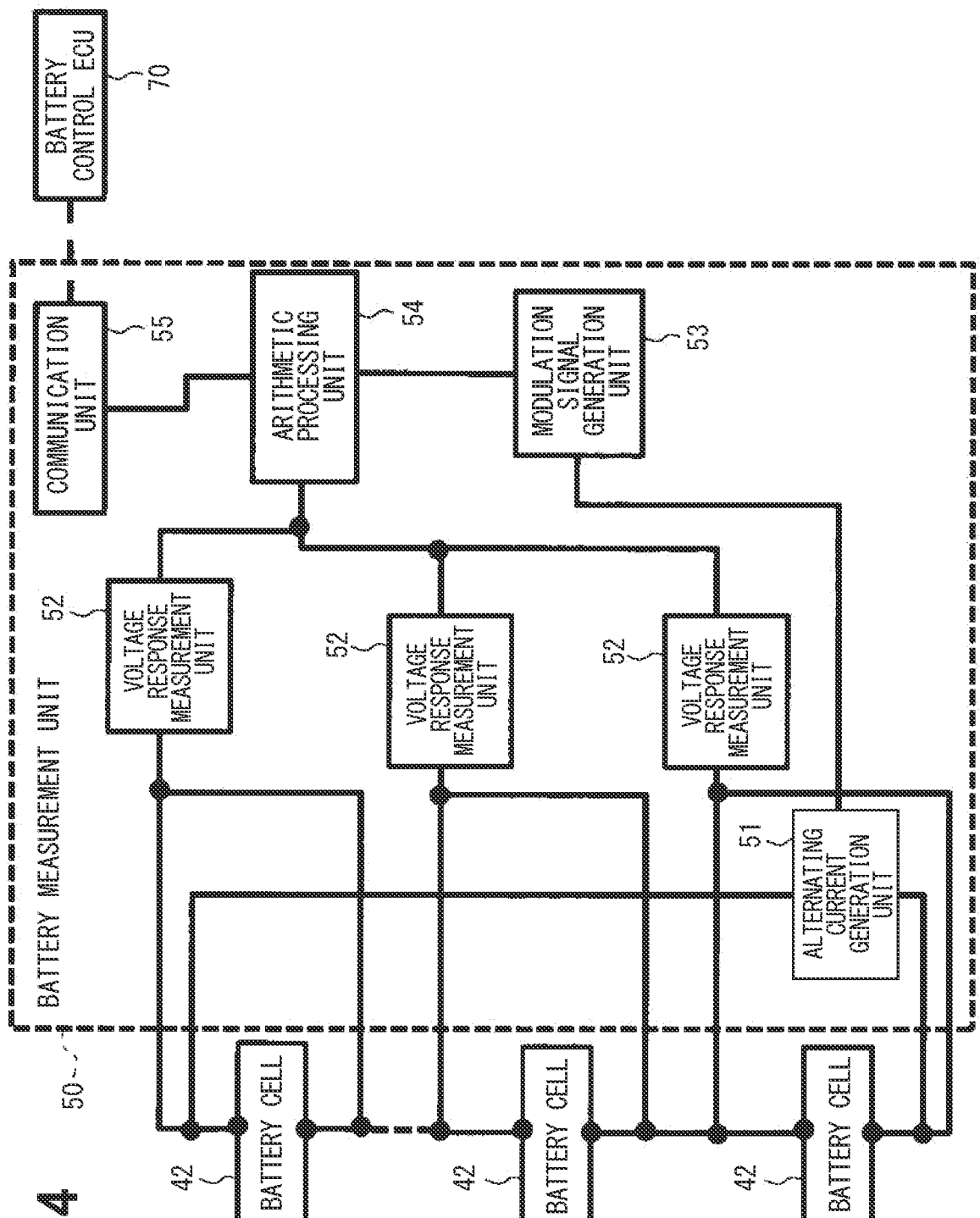
FIG. 14 is a block diagram of a battery measurement unit according to another modified example.

As illustrated in FIG. 14, the battery measurement unit 50 may include a single AC generation unit 51 for multiple battery cells 42, and may include the voltage response measurement unit 52 for each of the battery cells 42. When multiple battery cells 42 are set as the measurement targets, in other words, detection targets of the sign of thermal runaway, the alternating current collectively may flow in the multiple battery cells 42, and the voltage change of each of the battery cells 42 may be measured through each voltage response measurement unit 52.

Figure 15:
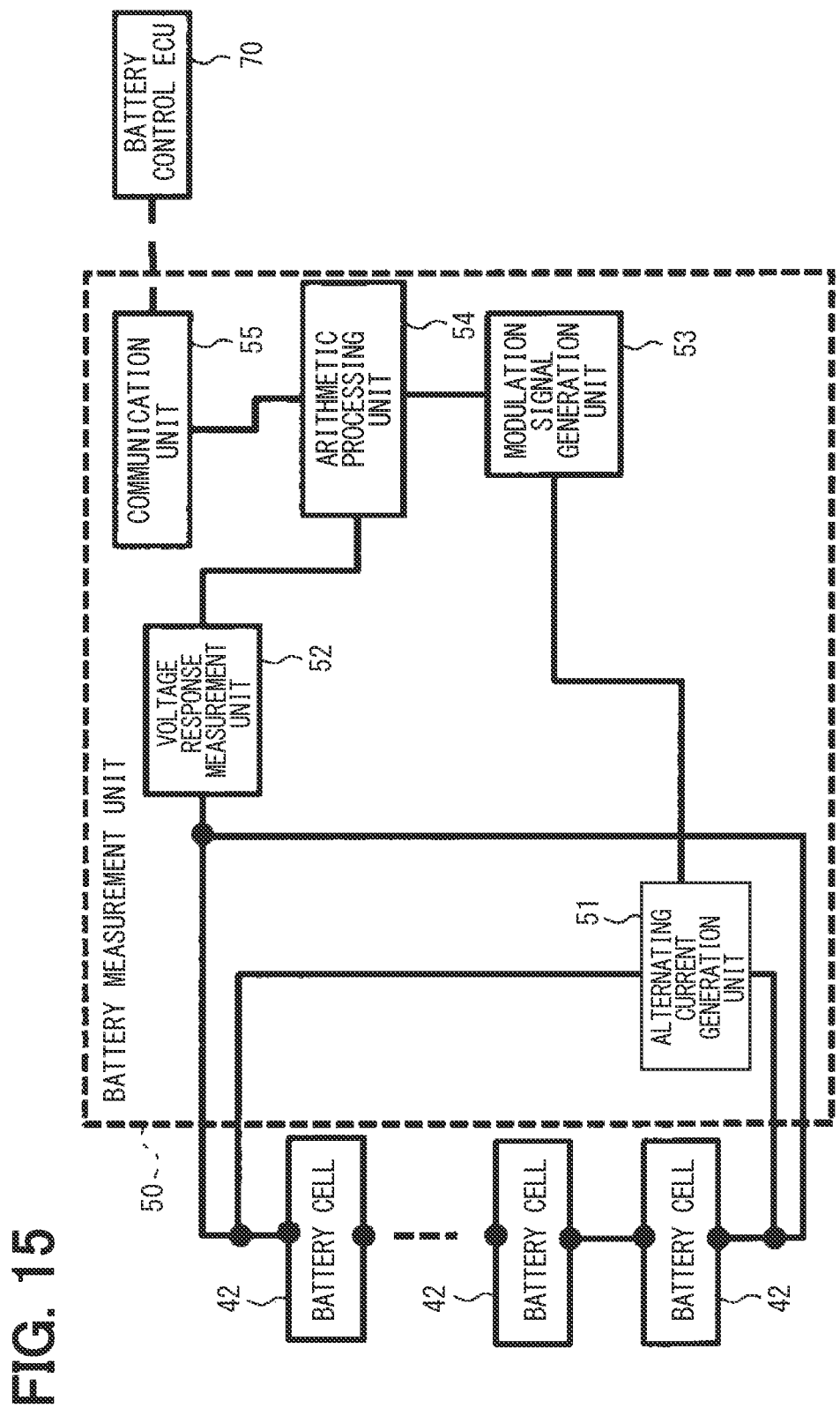
FIG. 15 is a block diagram of a battery measurement unit according to another modified example.

As shown in FIG. 15, the battery measurement unit 50 may include a single AC generation unit 51 and a single voltage response measurement unit 52 for multiple battery cells 42. When multiple battery cells 42 are set as the measurement targets, in other words, detection targets of the sign of thermal runaway, the alternating current collectively may flow in the multiple battery cells 42, and the voltage change of the multiple battery cells 42 may be collectively measured through the voltage response measurement unit 52.

The alternating current may flow through the entire battery module 41 to measure the voltage change of each of the battery cells 42 the voltage fluctuation of the entire battery module 41 for detecting the sign of thermal runaway. The alternating current may flow through the entire battery pack 40 to measure the voltage fluctuation of each of the battery cells 42, in other words, the voltage fluctuation of the entire battery pack 40 for detecting the sign of thermal runaway.

When the vehicle has been stopped after the determination time ts, in other words, when, for example, the ignition of the vehicle has been turned off after the determination time ts, the battery measurement unit 50 may activate the battery control ECU 70 if the battery control ECU 70 is in the sleep state. The mode switchover unit 71 and the TR detection unit 72 may be provided inside the battery measurement unit 50, for example, the arithmetic processing unit 54. In this case, the battery measurement unit 50 is constructed as a detector for detecting a sign of thermal runaway in a secondary battery.

The power supply for the battery control ECU 70 and the battery measurement unit 50 may be the battery pack 40, in other words, the battery module 41 with a high voltage or a lead battery with a low voltage or the like. The AC generation unit 51 can also be provided in, for example, a charger outside the vehicle. In addition, the function of detecting the sign of thermal runaway included in the battery measurement unit 50 and the battery control ECU 70 may be adapted to, for example, a vehicle charger, a battery measurement unit and a battery control ECU in an exchangeable battery pack, and a rechargeable energy management system (EMS) in a rechargeable station. The vehicle charger may be, for example, an AC charger, a DC charger, and a vehicle-to-home (V2H) charger. Similarly, the function of outputting the activation signal based on the measured value may also be adapted to, for example, the vehicle charger, the battery measurement unit and the battery control ECU in the exchangeable battery pack, and the rechargeable energy management system (EMS) in the rechargeable station. The vehicle charger may be, for example, the AC charger, the DC charger, and the vehicle-to-home (V2H) charger.

At the time of the ignition being turned off or the like, if the host ECU 60 is in the sleep state, the host ECU 60 or the like for issuing, for example, a warning may be activated when the sign of faults with the combination of the sign of thermal runaway and another diagnostic result are finally detected. When the sign of faults with the combination of the sign of thermal runaway and another diagnostic result are finally detected, the power supply of a machine to which a signal for notification of the sign of faults is transmitted can be ensured. In a case of detecting the sign of faults, the processing for detecting the sign of thermal runaway may be executed multiple times to ensure the detection of the sign of faults, based on a condition that the sign of thermal runaway has been detected multiple times. As a result, it is possible to inhibit erroneous detection of the sign of faults and erroneous operation of, for example, an alarm.

In the detection process in the above-described embodiment, the battery control ECU 70 calculates the measured value such as AC impedance measured after the activation to detect the sign of thermal runaway. As the modified example, the battery control ECU 70 may acquire the measured value stored in the memory 54a of the battery measurement unit 50 after the activation and calculate the measured value to detect the sign of thermal runaway based on the calculated result. For example, the battery measurement unit 50 may select the latest measured values and a measured value measured at the predetermined time Δt before the measurement of the latest measured value from the measured values stored in the memory 54a to execute the process in S207 based on these selected values.

In S208, when the activation time until the next activation is set, the activation time may be changed according to the measured value. For example, if the latest measured value received from the battery measurement unit 50 is within the boundary range between the predetermined normal range and the abnormal range, the activation time may set to be relatively short as compared with a situation of the normal range. As a result, it is possible to detect the sign of thermal runaway in advance, in a case where some kind of unusual change occurs in the battery cell 42.

In the above-described embodiment, the calculation of the AC impedance may be executed in the battery control ECU 70. In this situation, the battery control ECU 70 may request and receive measured values such as the alternating current and voltage value necessary for the calculation of the AC impedance.

In S207 in the above-described embodiment, the battery control ECU 70 determines the sign of thermal runaway, in a case where the rate of change in the real part of the zero-crossing point is larger than the threshold value C (in other words, S207: YES). As another example, based on the measured result measured in the first measurement mode, in a case where it is determined that the rate of change $\Delta VRe\_Z$ in the real part of the zero-crossing point is larger than the threshold value C in S207, the measurement may be again executed in the second measurement mode to finally determine whether or not there is a sign of thermal runaway based on the measured result. Based on the measured result in the second measurement mode, in a case where it is determined that there is a sign of runaway, the processing executed in S210, in other words, the notification to the host ECU 60 or the like may be executed.

The modified examples described above may be implemented in combination. The control unit and the technique according to the present disclosure may be achieved by a dedicated computer provided by constituting a processor and a memory programmed to execute one or more functions embodied by a computer program. Alternatively, the controller and the method described in the present disclosure may be implemented by a special purpose computer configured as a processor with one or more special purpose hardware logic circuits. Alternatively, the controller and the method described in the present disclosure may be implemented by one or more special purpose computer, which is configured as a combination of a processor and a memory, which are programmed to perform one or more functions, and a processor which is configured with one or more hardware logic circuits. The computer program may be stored, as instructions to be executed by a computer, in a tangible non-transitory computer-readable medium.

What is claimed is:

1. A detector for detecting a sign of thermal runaway in a secondary battery, the detector comprising:
    a measurement unit configured to measure a measurement value indicating a battery state of the secondary battery; and
    a battery control unit configured to detect the sign of thermal runaway in the secondary battery, wherein
    the measurement unit is further configured to:
        determine whether the battery control unit is in a sleep state;
        determine whether a start-up signal is output based on the measurement value, based on a condition that the measurement unit determines that the battery control unit is in the sleep state; and
        output the start-up signal in a case where the start-up signal is output, and
    the battery control unit is further configured to:
        start by receiving the start-up signal from the measurement unit when the battery control unit is in the sleep state;
        execute arithmetic processing on the measurement value received from the measurement unit; and
        detect the sign of thermal runaway based on a calculated result of the arithmetic processing.

2. The detector according to claim 1, wherein
the measurement unit includes a memory configured to store the measurement value, and
the battery control unit is further configured to:
    receive the measurement value stored in the memory of the measurement unit when the battery control unit starts by receiving the start-up signal;
    execute the arithmetic processing on the measurement value; and
    detect the sign of thermal runaway based on the calculated result of the arithmetic processing.

3. The detector according to claim 1,
wherein the measurement unit is further configured to output the start-up signal based on a condition that amount of change in the measurement value per unit time is larger than a predetermined value when the battery control unit is in the sleep state.

4. The detector according to claim 1, wherein
the battery control unit includes a start-up instruction circuit configured to provide a start-up instruction of starting the battery control unit being in the sleep state in a start-up time which is preliminarily set,
the battery control unit is further configured to:
    start by receiving the start-up instruction from the start-up instruction circuit to receive the measurement value from the measurement unit;
    execute the arithmetic processing on the measurement value; and
    detect the sign of thermal runaway based on the calculated result of the arithmetic processing,
the start-up time until next start-up of the battery control unit is set when the battery control unit is switched to the sleep state, and
the start-up time until the next start-up is set to be shorter in a case where the battery control unit starts by receiving the start-up signal from the measurement unit than in a case where the battery control unit starts by the start-up instruction from the start-up instruction circuit.

5. The detector according to claim 1, wherein
the measurement unit is further configured to:
    control the secondary battery to receive or output a fluctuating current;
    measure fluctuation of a voltage of the secondary battery corresponding to the fluctuating current; and
    calculate an alternating-current impedance of the secondary battery based on the fluctuation of the voltage of the secondary battery,
the battery control unit is further configured to detect the sign of thermal runaway in the secondary battery in a case where a rate of change in a real part of the alternating-current impedance is larger than a threshold value, and
the rate of change in the real part of the alternating-current impedance calculated based on the fluctuation of the voltage measured by the measurement unit is measured with the fluctuating current at a predetermined frequency at which a value of an imaginary part of the alternating-current impedance calculated by the measurement unit reaches zero.

6. The detector according to claim 1, wherein
the measurement unit is further configured to measure fluctuation of a voltage in the secondary battery through a first mode and a second mode which have different number of measurements of the fluctuation of the voltage in the secondary battery corresponding to the fluctuating current output from the secondary battery,
the number of measurements in the first mode is larger than the number of measurements in the second mode, and
the battery control unit includes:
    a switchover unit configured to switch the measurement unit to the second mode in a case where the secondary battery has stopped operating; and
    a detection unit configured to detect the sign of thermal runaway in the secondary battery based on a condition that the measurement unit is switched to the second mode by the switchover unit in a case where a rate of change in a real part of an alternating-current impedance of the secondary battery is larger than a threshold value, and
the rate of change in the real part of the alternating-current impedance calculated based on the fluctuation of the voltage measured by the measurement unit is measured with the fluctuating current at a predetermined frequency at which a value of an imaginary part of the alternating-current impedance calculated by the measurement unit reaches zero.

7. The detector according to claim 1, wherein, during the sleep state, the battery control unit is in a non-operational mode.

8. The detector according to claim 1, wherein the measurement unit is further configured to measure an impedance value of a battery cell of the secondary battery by calculating a complex impedance from a voltage response to an applied alternating current.

9. A non-transitory computer readable medium storing a computer program in a detector including a measurement unit for measuring a measurement value indicating a battery state of a secondary battery and a battery control unit for detecting a sign of thermal runaway in the secondary battery, the computer program comprising instructions configured to, when executed by a processor, cause the processor to execute:
controlling the measurement unit to determine whether the battery control unit is in a sleep state;
determining whether a start-up signal is output based on the measurement value, based on a condition that the measurement unit determines that the battery control unit is in a sleep state;
outputting the start-up signal in a case where the start-up signal is output;
starting the battery control unit on a condition that the battery control unit receives the start-up signal from the measurement unit when the battery control unit is in the sleep state;
executing arithmetic processing on the measurement value received from the measurement unit; and
detecting the sign of thermal runaway based on a calculated result of the arithmetic processing.

10. A detector for detecting a sign of thermal runaway in a secondary battery, the detector comprising:
a measurement unit configured to measure a measurement value indicating a battery state of the secondary battery; and
a battery control unit configured to detect the sign of thermal runaway in the secondary battery, wherein
the measurement unit is further configured to:
determine whether a start-up signal is output based on the measurement value in a case where the battery control unit is in a sleep state; and
output the start-up signal in a case where the start-up signal is output, the battery control unit is further configured to:
start by receiving the start-up signal from the measurement unit when the battery control unit is in the sleep state;
execute arithmetic processing on the measurement value received from the measurement unit; and
detect the sign of thermal runaway based on a calculated result of the arithmetic processing,
the battery control unit includes a start-up instruction circuit configured to provide a start-up instruction of starting the battery control unit being in the sleep state in a start-up time which is preliminarily set,
the battery control unit is further configured to:
start by receiving the start-up instruction from the start-up instruction circuit to receive the measurement value from the measurement unit;
execute the arithmetic processing on the measurement value; and
detect the sign of thermal runaway based on the calculated result of the arithmetic processing,
the start-up time until next start-up of the battery control unit is set when the battery control unit is switched to the sleep state, and
the start-up time until the next start-up is set to be shorter in a case where the battery control unit starts by receiving the start-up signal from the measurement unit than in a case where the battery control unit starts by the start-up instruction from the start-up instruction circuit.

* * * * *